US008954705B2

(12) United States Patent
Chang

(10) Patent No.: US 8,954,705 B2
(45) Date of Patent: Feb. 10, 2015

(54) MEMORY SPACE MANAGEMENT METHOD AND MEMORY CONTROLLER AND MEMORY STORAGE DEVICE AND MEMORY STORAGE USING THE SAME

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 494 days.

(21) Appl. No.: 13/471,459

(22) Filed: May 15, 2012

(65) Prior Publication Data

US 2013/0262810 A1     Oct. 3, 2013

(30) Foreign Application Priority Data

Apr. 3, 2012   (TW) .................................. 101111867

(51) Int. Cl.
*G06F 12/00*    (2006.01)

(52) U.S. Cl.
USPC ................... 711/170; 711/103; 711/E12.008; 711/E12.084

(58) Field of Classification Search
USPC .................................................. 711/170, 103
See application file for complete search history.

(56) References Cited

U.S. PATENT DOCUMENTS

2005/0144363 A1* 6/2005 Sinclair ......................... 711/103

* cited by examiner

*Primary Examiner* — Aracelis Ruiz
(74) *Attorney, Agent, or Firm* — Jianq Chyun IP Office

(57) ABSTRACT

A memory space management method adapted to a rewritable non-volatile memory module having a plurality of physical blocks is provided. In the memory space management method, a first area and a second area are configured. An authentication information is received from a host system, and whether the authentication information matches a predetermined authentication information is determined. If the authentication information does not match the predetermined authentication information, a counting value is updated. If the counting value matches a predetermined number, a first procedure is executed. In the first procedure, a third area is configured, wherein the capacity of the third area is a sum of the capacity of the first area and at least a portion of the capacity of the second area. The third area is provided to the host system to be accessed. Thereby, the memory space of the rewritable non-volatile memory module is effectively used.

18 Claims, 12 Drawing Sheets

MEMORY SPACE MANAGEMENT METHOD AND MEMORY CONTROLLER AND MEMORY STORAGE DEVICE AND MEMORY STORAGE USING THE SAME

CROSS-REFERENCE TO RELATED APPLICATION

This application claims the priority benefit of Taiwan application serial no. 101111867, filed on Apr. 3, 2012. The entirety of the above-mentioned patent application is hereby incorporated by reference herein and made a part of this specification.

BACKGROUND

1. Technology Field

The invention generally relates to a memory space management method, and more particularly, to a memory space management method adapted to a rewritable non-volatile memory and a memory controller and a memory storage device using the same.

2. Description of Related Art

Along with the widespread of digital cameras, cell phones, and MP3 in recently years, the consumers' demand to storage media has increased drastically. Rewritable non-volatile memory module is one of the most adaptable storage media to aforementioned battery-powered portable products due to its many characteristics such as data non-volatility, low power consumption, small volume, and non-mechanical structure. A memory card is a storage device which uses a NAND flash memory as its storage medium. Memory card has been broadly used for storing personal important data thanks to its small volume and large capacity.

Because memory storage devices having NAND flash memories as their storage media are usually very small, the possibility of losing such a memory storage device is very high. In order to prevent important data stored in such a memory storage device from being accessed by unauthorized people in case the memory storage device is lost, many encryption and authentication techniques have been developed. For example, a plurality of logical block addresses are configured and mapped to a plurality of physical blocks in a rewritable non-volatile memory module, and these logical block addresses are grouped into a general partition and a secured partition. A user has to pass the identity verification (for example, password or fingerprint comparison) before the user can access data stored in the secured partition. Besides, after the identify verification fails for over a predetermined number, the secured partition is locked and becomes inaccessible. However, after the secured partition is locked, those physical blocks mapped to the logical block addresses in the secured partition cannot be accessed and used anymore, which causes a waste of memory space. Thereby, how to develop a memory space management method that allows the locked secured partition to be re-used has become a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a memory space management method, a memory controller, and a memory management circuit, in which the memory space of the memory storage device can be effectively used.

An exemplary embodiment of the invention provides a memory space management method adapted to a rewritable non-volatile memory module. The rewritable non-volatile memory module includes a plurality of physical blocks. The memory space management method includes following steps. A plurality of first logical block addresses is configured to map to a part of the physical blocks, and the first logical block addresses are grouped into at least a first area and a second area, wherein the capacity of the first area is a first capacity, and the capacity of the second area is a second capacity. A first handshaking command is received from a host system. A first message is transmitted to the host system to respond to the first handshaking command, wherein the first message is used for notifying the host system that the rewritable non-volatile memory module has the first area. The memory space management method further includes following steps. An authentication information is received from the host system, and whether the authentication information matches a predetermined authentication information is determined. If the authentication information does not match the predetermined authentication information, a counting value is updated. If the counting value matches a predetermined number, a first procedure is executed. In the first procedure, a plurality of second logical block addresses is configured, and the second logical block addresses are grouped into a third area, wherein the capacity of the third area is a sum of the first capacity and at least a portion of the second capacity. Besides, in the first procedure, the third area is provided to the host system to be accessed by the host system.

An exemplary embodiment of the invention provides a memory storage device including a connector, a rewritable non-volatile memory module, and a memory controller. The connector is configured to couple to a host system. The rewritable non-volatile memory module includes a plurality of physical blocks. The memory controller is coupled to the connector and the rewritable non-volatile memory module. The memory controller configures a plurality of first logical block addresses to map to a part of the physical blocks and groups the first logical block addresses into at least a first area and a second area, wherein the capacity of the first area is a first capacity, and the capacity of the second area is a second capacity. The memory controller also receives a first handshaking command from a host system and transmits a first message to the host system to respond to the first handshaking command, wherein the first message is used for notifying the host system that the memory storage device has the first area. The memory controller further receives an authentication information from the host system and determines whether the authentication information matches a predetermined authentication information. If the authentication information does not match the predetermined authentication information, the memory controller updates a counting value. If the counting value matches a predetermined number, the memory controller configures a plurality of second logical block addresses. The memory controller further groups the second logical block addresses into a third area, wherein the capacity of the third area is a sum of the first capacity and at least a portion of the second capacity. Additionally, the memory controller provides the third area to the host system to be accessed by the host system.

An exemplary embodiment of the invention also provides a memory controller including a host interface, a memory interface, and a memory management circuit. The host interface is configured to couple to a host system. The memory interface is configured to couple to a rewritable non-volatile memory module having a plurality of physical blocks. The memory management circuit is coupled to the host interface and the memory interface. The memory management circuit configures a plurality of first logical block addresses to map to a part of the physical blocks and groups the first logical block addresses into at least a first area and a second area, wherein the capacity of the first area is a first capacity, and the capacity of the second area is a second capacity. The memory management circuit also receives a first handshaking command from a host system and transmits a first message to the host system to respond to the first handshaking command, wherein the first message is used for notifying the host system that the rewritable non-volatile memory module has the first area. The memory management circuit further receives an authentication information from the host system and determines whether the authentication information matches a predetermined authentication information. If the authentication information does not match the predetermined authentication information, the memory management circuit updates a counting value. If the counting value matches a predetermined number, the memory management circuit configures a plurality of second logical block addresses. The memory management circuit further groups the second logical block addresses into a third area, wherein the capacity of the third area is a sum of the first capacity and at least a portion of the second capacity. Additionally, the memory management circuit provides the third area to the host system to be accessed.

An exemplary embodiment of the invention further provides a memory space management method adapted to a rewritable non-volatile memory module. The rewritable non-volatile memory module includes a plurality of physical blocks. The memory space management method includes following steps. A plurality of first logical block addresses is configured to map to a part of the physical blocks, and the first logical block addresses are grouped into at least a first area and a second area. An authentication information is received from the host system, and whether the authentication information matches a predetermined authentication information is determined. If the authentication information matches the predetermined authentication information, a second procedure is executed. The second procedure includes notifying the host system that the second area is accessible. The memory space management method also includes following steps. If the authentication information does not match the predetermined authentication information, a counting value is updated, and whether the counting value matches a predetermined number is determined. If the counting value does not match the predetermined number, a third procedure is executed. The third procedure includes notifying the host system that the rewritable non-volatile memory module has the first area and the second area and setting the first area as accessible and the second area as inaccessible. The memory space management method further includes following steps. If the counting value matches the predetermined number, a first procedure is executed. The first procedure includes setting a valid data in the second area as inaccessible, notifying the host system that the rewritable non-volatile memory module has a third area, and setting the third area as accessible, wherein the third area includes the first area and at least a portion of the second area.

As described above, in a memory space management method, a memory controller, and a memory storage device provided by an exemplary embodiment of the invention, a second area that might be locked in a conventional technique is provided to a host system after mismatch between authentication information and predetermined authentication information happens for over a predetermined number of times. Thereby, the memory space of the memory storage device is effectively used.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
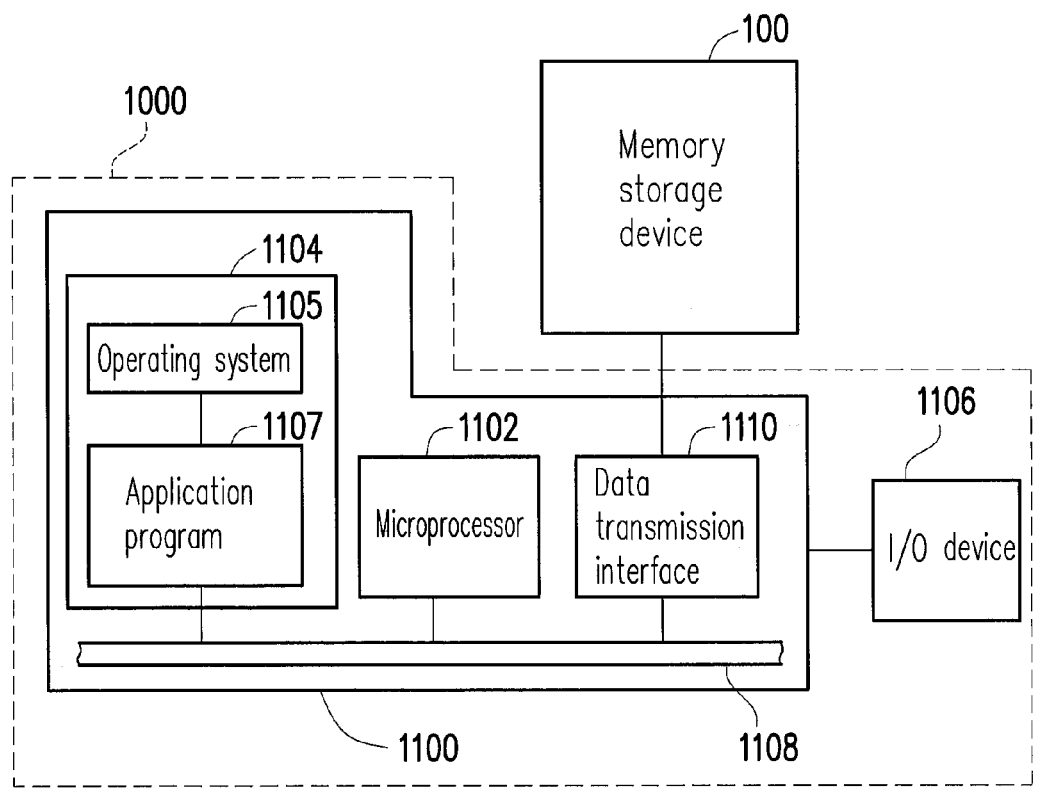
FIG. 1A illustrates a host system and a memory storage device according to a first exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

A memory storage device (or a memory storage system) usually includes a rewritable non-volatile memory module and a controller (i.e., a control circuit). The memory storage device is usually used along with a host system so that the host system can write data into or read data from the memory storage device.

FIG. 1A illustrates a host system and a memory storage device according to the first exemplary embodiment.

Figure 1B:
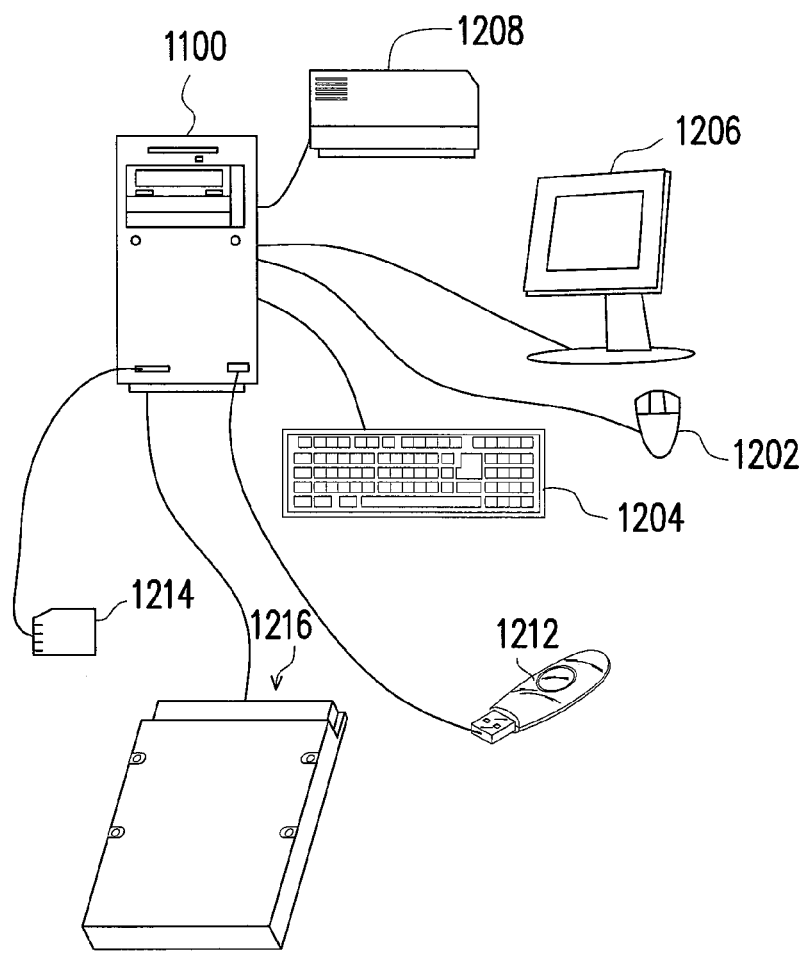
FIG. 1B is a diagram of a computer, an input/output (I/O) device, and a memory storage device according to the first exemplary embodiment.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The microprocessor 1102 executes an operating system (OS) 1105 and an application program 1107 loaded into the RAM 1104 so that the host system 1000 can provide functions according to a user's operations. The I/O device 1106 includes a mouse 1202, a keyboard 1204, a display 1206, and a printer 1208, as shown in FIG. 1B. It should be understood that the I/O device 1106 is not limited to the devices illustrated in FIG. 1B and may further include other devices.

In the present embodiment, the memory storage device 100 is coupled to other components of the host system 1000 through the data transmission interface 1110. Data can be written into or read from the memory storage device 100 through the operations of the microprocessor 1102, the RAM 1104, and the I/O device 1106. The memory storage device 100 may be a rewritable non-volatile memory storage device, such as the flash drive 1212, the memory card 1214, or the solid state drive (SSD) 1216 illustrated in FIG. 1B.

Figure 1C:
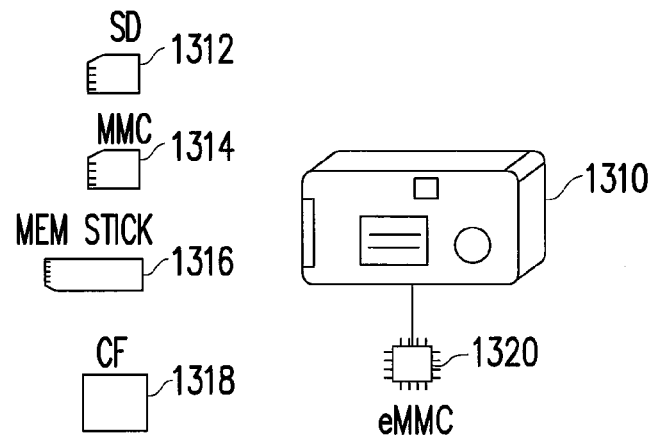
FIG. 1C is a diagram of a host system and a memory storage device according to the first exemplary embodiment.

Generally speaking, the host system 1000 can be substantially any system that can work with the memory storage device 100 to store data. Even tough the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to the motherboard of the host system.

Figure 2:
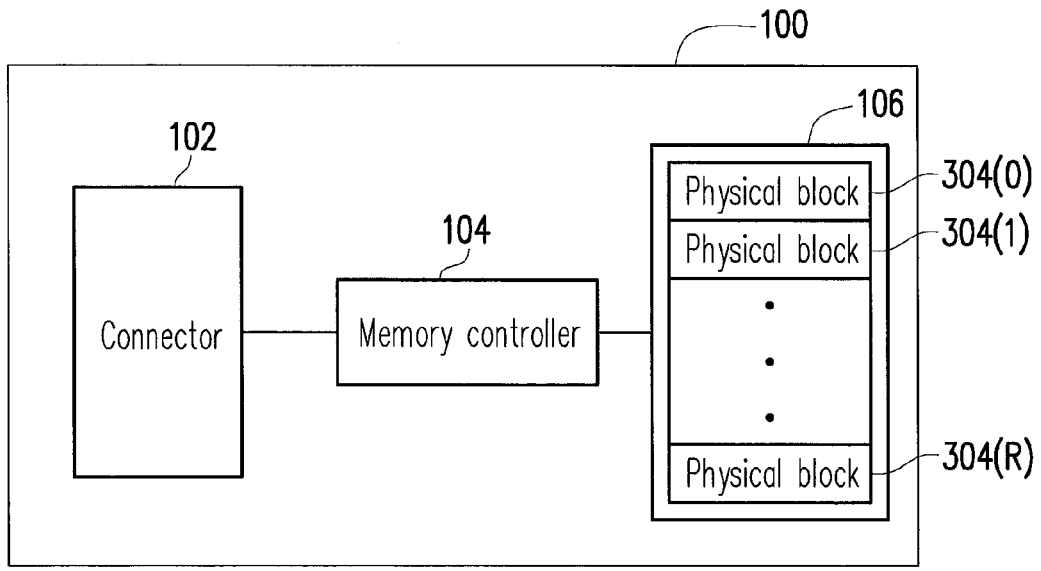
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment, the connector 102 complies with the secure digital (SD) interface standard. However, the invention is not limited thereto, and the connector 102 may also comply with the parallel advanced technology attachment (PATA) standard, the serial advanced technology attachment (SATA) standard, the Institute of Electrical and Electronic Engineers (IEEE) 1394 standard, the peripheral component interconnect (PCI) express standard, the universal serial bus (USB) standard, the MS interface standard, the MMC interface standard, the CF interface standard, the integrated device electronics (IDE) standard, or any other suitable standard.

The memory controller 104 executes a plurality of logic gates or control instructions implemented in a hardware form or a firmware form and performs various data operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has physical blocks 304(0)-304 (R). The physical blocks 304(0)-304(R) may belong to a same memory die or different memory dies. Each physical block has a plurality of physical pages, and each of the physical pages has at least one physical sector, wherein the physical pages belonging to the same physical block can be individually written but have to be erased all together. Each physical block may be composed of 128 physical pages, and each physical page may have 8 physical sectors. Namely, in the case that the capacity of each physical sector is 512 bytes, the capacity of each physical page is 4 kilobytes (KB). However, the invention is not limited thereto, and each physical block may also be composed of 64, 256, or any other number of physical pages.

To be specific, physical block is the smallest unit for erasing data. Namely, each physical block contains the least number of memory cells that are erased all together. Physical page is the smallest unit for programming data. Namely, physical page is the smallest unit for writing data. However, in another exemplary embodiment of the invention, the smallest unit for writing data may also be physical sector or another unit. Each physical page usually includes a data bit area and a redundant bit area. The data bit area is used for storing user data, and the redundant bit area is used for storing system data (for example, error checking and correcting (ECC) codes).

In the present exemplary embodiment, the rewritable non-volatile memory module 106 is a multi level cell (MLC) NAND flash memory module (i.e., each memory cell stores at least two bit data). However, the invention is not limited thereto, and the rewritable non-volatile memory module 106 may also be a single level cell (SLC) NAND flash memory module, a trinary level cell (TLC) NAND flash memory module, any other suitable flash memory module, or any other memory module with the same characteristics.

Figure 3:
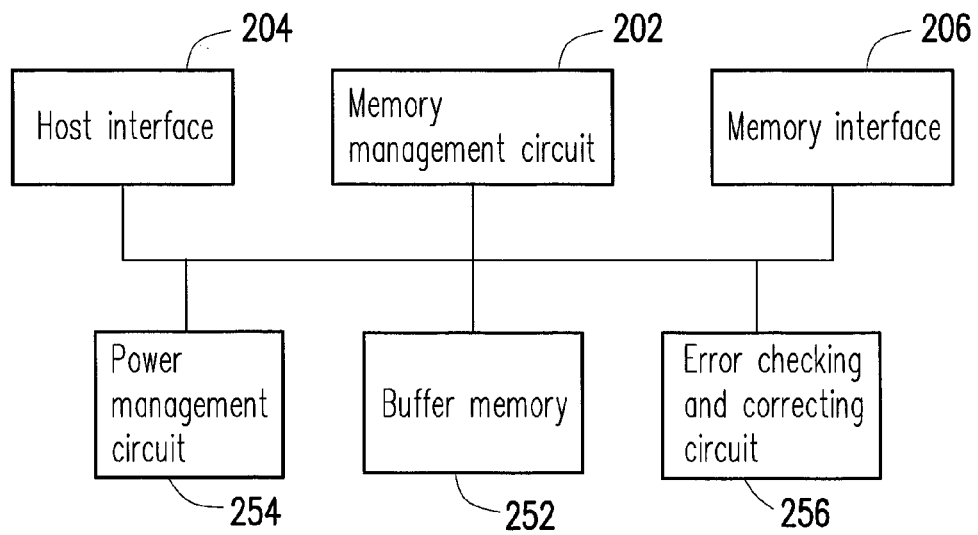
FIG. 3 is a schematic block diagram of a memory controller according to the first exemplary embodiment.

FIG. 3 is a schematic block diagram of a memory controller according to the first exemplary embodiment.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage device 100 is in operation, the control instructions are executed to perform data writing, writing reading and data erasing, etc.

In the present exemplary embodiment, the control instructions of the memory management circuit 202 are implemented in a firmware form. For example, the memory management circuit 202 has a microprocessor unit (not shown)

and a read-only memory (ROM, not shown), and the control instructions are burnt into the ROM. When the memory storage device 100 is in operation, the control instructions are executed by the microprocessor unit to carry out data writing, writing reading and data erasing, etc.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a driving code segment. When the memory controller 104 is enabled, the microprocessor unit first executes the driving code segment to load the control instructions from the rewritable non-volatile memory module 106 into the RAM of the memory management circuit 202. Thereafter, the microprocessor unit runs the control instructions to perform various data operations.

Moreover, in yet another exemplary embodiment of the invention, the control instructions of the memory management circuit 202 may also be implemented in a hardware form. For example, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage the physical blocks of the rewritable non-volatile memory module 106. The memory writing unit is configured to issue a write command to the rewritable non-volatile memory module 106 to write data into the rewritable non-volatile memory module 106. The memory reading unit is configured to issue a read command to the rewritable non-volatile memory module 106 to read data from the rewritable non-volatile memory module 106. The memory erasing unit is configured to issue an erase command to the rewritable non-volatile memory module 106 to erase data from the rewritable non-volatile memory module 106. The data processing unit is configured to process data to be written into and read from the rewritable non-volatile memory module 106.

The host interface 204 is coupled to the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 complies with the SD standard. However, the invention is not limited thereto, and the host interface 204 may also comply with the PATA standard, the SATA standard, the IEEE 1394 standard, the PCI express standard, the USB standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 executes the ECC procedure on the data according to the ECC code.

Figure 4:
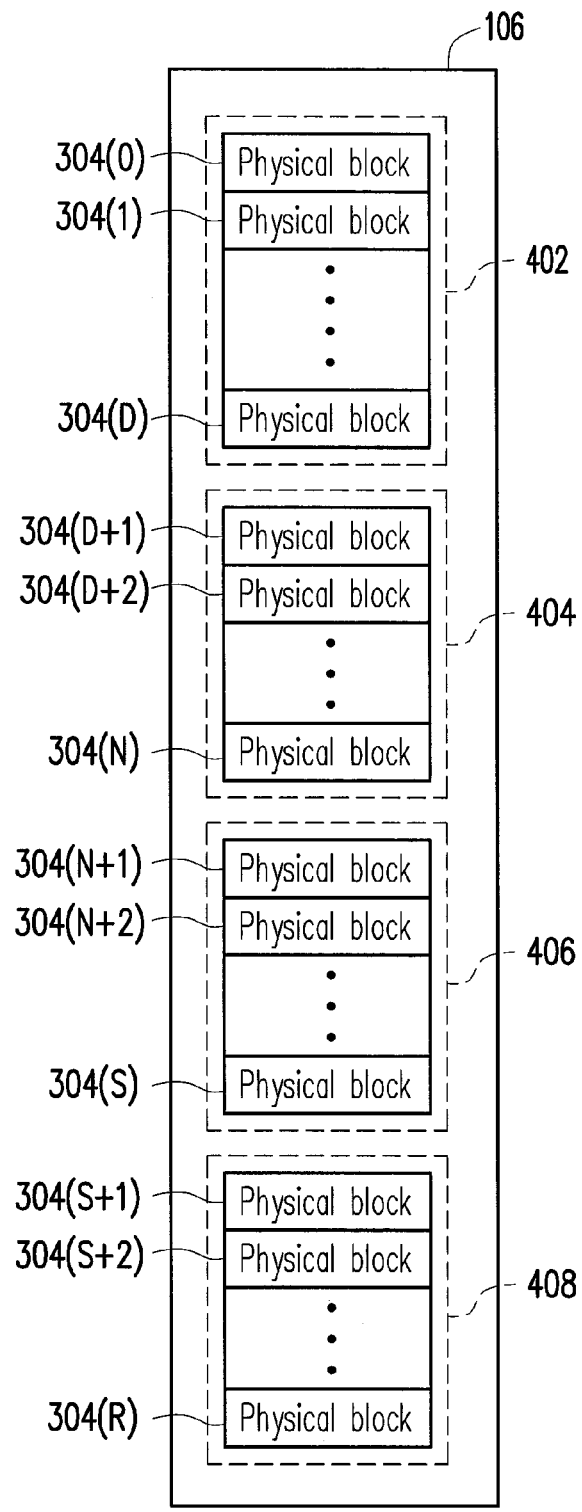
FIG. 4 and FIG. 5 are diagrams illustrating an example of managing a rewritable non-volatile memory module according to the first exemplary embodiment.
Figure 5:
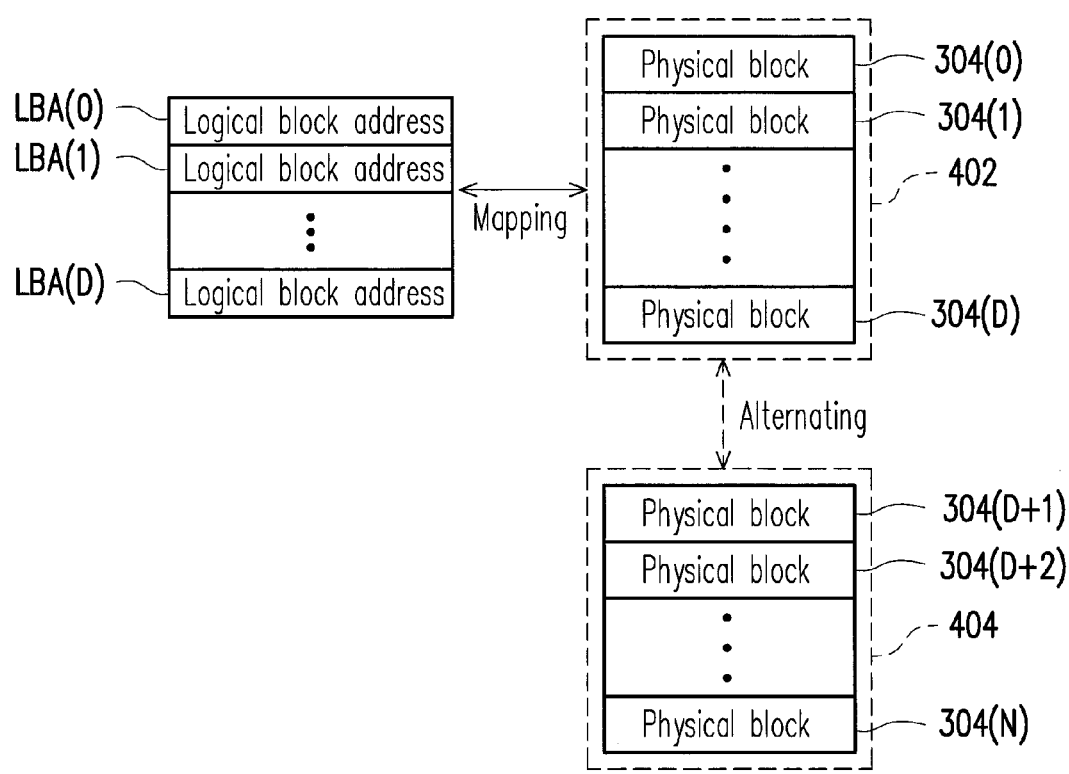

FIG. 4 and FIG. 5 are diagrams illustrating an example of managing a rewritable non-volatile memory module according to the first exemplary embodiment.

Herein it should be understood that while describing the operations performed on physical blocks of the rewritable non-volatile memory module 106, the terms like "select", "substitute", "group", and "alternate" refer to logical operations performed on the physical blocks. Namely, the actual positions of the physical blocks in the rewritable non-volatile memory module 106 are not changed and the operations are logically performed on the physical blocks of the rewritable non-volatile memory module 106.

Referring to FIG. 4, the memory controller 104 logical groups the physical blocks 304(0)-304(R) of the rewritable non-volatile memory module 106 into a plurality of areas, such as a data area 402, a spare area 404, a system area 406, and a replacement area 408. In another exemplary embodiment, the replacement area 408 and the spare area 404 share physical blocks containing invalid data.

Physical blocks in the data area 402 and the spare area 404 are used for storing data from the host system 1000. To be specific, physical blocks in the data area 402 already contain data, and physical blocks in the spare area 404 are used for substituting the physical blocks in the data area 402. Thus, physical blocks in the spare area 404 are either blank or available physical blocks (i.e., no data is recorded therein or data recorded therein is already marked as invalid data). Namely, erasing operations have been performed on the physical blocks in the spare area 404, or when the physical blocks in the spare area 404 are selected for storing data, erasing operations are first performed on the selected physical blocks. Thereby, physical blocks in the spare area 404 are available physical blocks.

Physical blocks logically belonging to the system area 406 are used for recording system data, such as the manufacturer and model of the memory chip, the number of physical blocks in the memory chip, and the number of physical pages in each physical block.

Physical blocks logically belonging to the replacement area 408 are substitution physical blocks. For example, when the rewritable non-volatile memory module 106 is manufactured, 4% of its physical blocks are reserved for replacement purpose. Namely, when the physical blocks in the data area 402, the spare area 404, and the system area 406 are damaged, the physical blocks reserved in the replacement area 408 are used for replacing the damaged physical blocks (i.e., bad blocks). Thus, if there are still normal physical blocks in the replacement area 408 and a physical block is damaged, the memory controller 104 selects a normal physical block from the replacement area 408 to replace the damaged physical block. If there is no more normal physical block in the replacement area 408 and a physical block is damaged, the memory controller 104 announces that the memory storage device 100 is in a write protect status and can not be used for writing data any more.

Particularly, the numbers of physical blocks in the data area 402, the spare area 404, the system area 406, and the replacement area 408 vary with different memory specifications. In addition, during the operation of the memory storage device 100, the physical blocks grouped into the data area 402, the spare area 404, the system area 406, and the replacement area 408 are dynamically changed. For example, when a physical block in the spare area 404 is damaged and replaced by a physical block selected from the replacement area 408, the physical block originally in the replacement area 408 is associated with the spare area 404.

Referring to FIG. 5, as described above, the physical blocks in the data area 402 and the spare area 404 are alternatively used for storing data written by the host system 1000. In the present exemplary embodiment, the memory controller 104 configures logical block addresses LBA(0)-LBA(D) (also referred to as first logical block addresses) to access the physical blocks alternatively used for storing data. For example, when the memory storage device 100 is formatted by the OS 1110 through a file system (for example, FAT 32), the logical block addresses LBA(0)-LBA(D) are respectively mapped to the physical blocks 304(0)-304(D) in the data area 402. Herein the memory management circuit 202 establishes a logical block address-physical block mapping table to record the mapping relationship between the logical block addresses and the physical blocks.

In the present exemplary embodiment, the memory storage device 100 is a memory card. According to the memory card specifications, one memory card supports only one partition. Thus, in order to protect important data in the memory storage device 100 from being accessed by unauthorized people when the memory storage device 100 is lost, the memory management circuit 202 groups the logical block addresses LBA(0)-LBA(D) into a first area and a second area and sets the second area as being accessible only to those who pass identify verification.

Figure 6:
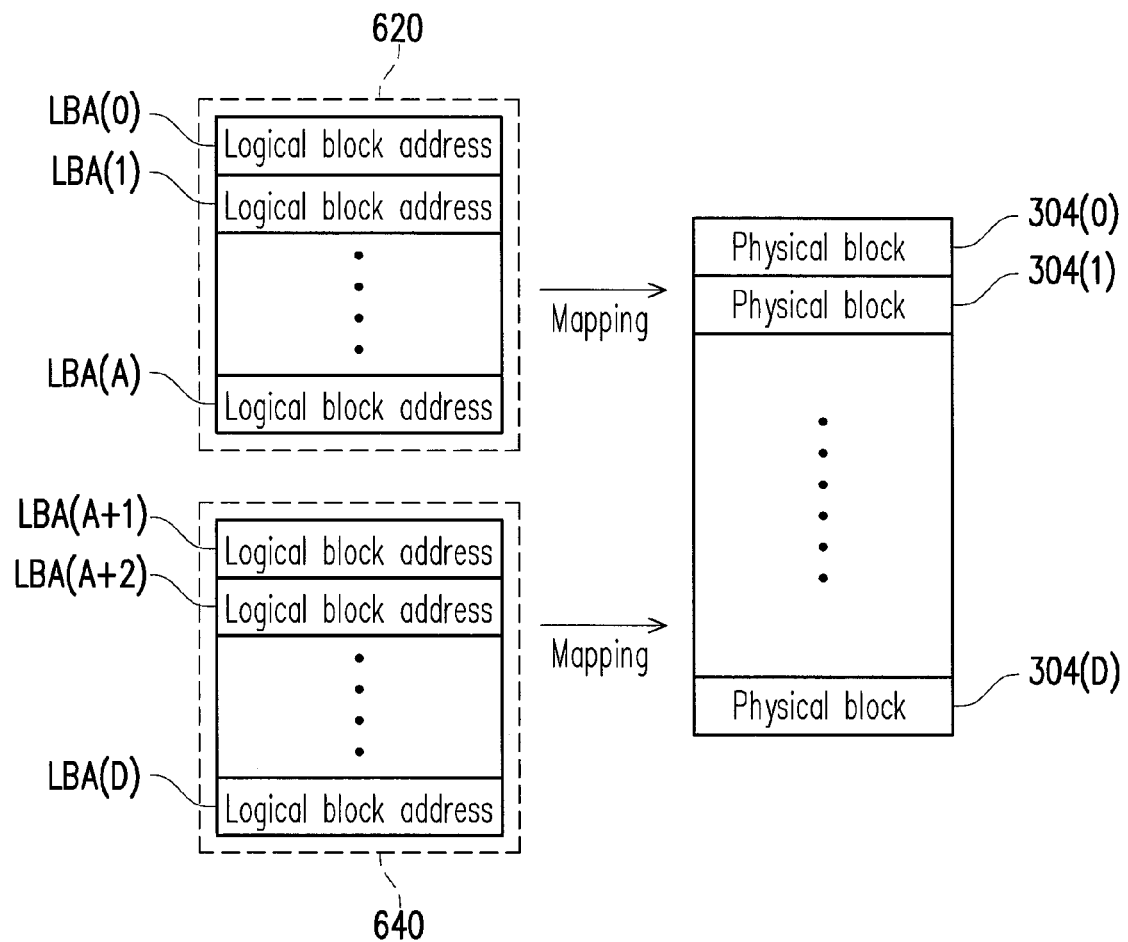
FIG. 6 is a diagram illustrating an example of a first area and a second area according to the first exemplary embodiment.

FIG. 6 is a diagram illustrating an example of the first area and the second area according to the first exemplary embodiment.

Referring to FIG. 6, the first area 620 includes logical block addresses LBA(0)-LBA(A), and the second area 640 includes logical block addresses LBA(A+1)-LBA(D). Besides, herein it is assumed that the capacity of the first area 620 is a first capacity and the capacity of the second area 640 is a second capacity. In the present exemplary embodiment, the second area 640 is set to be accessible only to those who pass identify verification. Namely, before passing the identify verification, the host system 1000 can only access the first area 620. To be specific, every time when the host system 1000 is turned on, the basic input/output system (BIOS) of the host system 1000 identifies the memory storage device 100 through a handshaking procedure. In the handshaking procedure, the host system 1000 obtains information such as the type (for example, a large-capacity storage device) and capacity of the memory storage device 100. In particular, the host system 1000 transmits a handshaking command (also referred to as a first handshaking command) to the memory management circuit 202 according to the memory card specifications, wherein the handshaking command is used for inquiring what areas the memory storage device 100 has. After receiving the first handshaking command, the memory management circuit 202 transmits a message (also referred to as a first message) to the host system 1000 to respond to the received first handshaking command. Besides, the memory management circuit 202 sets the first message to notify the host system 1000 that the memory storage device 100 has only the first area 620. Thereafter, the host system 1000 can access the logical block addresses LBA(0)-LBA(A), and the capacity available to the host system 1000 is the first capacity of the first area 620.

In an exemplary embodiment, a password verification program is stored in the physical blocks mapped to the logical block addresses LBA(0)-LBA(A). The host system 1000 executes the password verification program by accessing the logical block addresses LBA(0)-LBA(A), so as to verify the identity of a user. When the password verification program is executed, the host system 1000 requests the user of the host system 1000 to input an authentication information. The host system 1000 transmits the authentication information input by the user to the memory management circuit 202. The memory management circuit 202 determines whether the authentication information matches a predetermined authentication information. The authentication information may contain a user ID and a user password, and the predetermined authentication information may contain a predetermined user ID and a predetermined user password. The predetermined authentication information may be stored in the system area 406 in advance. If the authentication information does not match the predetermined authentication information, the memory management circuit 202 updates a counting value to record the number of times the user of the host system 1000 inputs incorrect authentication information. Besides, the memory management circuit 202 determines whether the counting value matches a predetermined number. For example, the predetermined number is 3, and the counting value is preset to 0. When the authentication information does not match the predetermined authentication information, the memory management circuit 202 adds 1 to the counting value and determines whether the counting value is greater than or equal to 3. Besides, the counting value is considered matching the predetermined number if the counting value is greater than or equal to 3. However, in other exemplary embodiments, the counting value is preset to the predetermined number (i.e., 3). In this case, when the authentication information does not match the predetermined authentication information, the memory management circuit 202 deducts 1 from the counting value and determines whether the counting value is smaller than or equal to 0. Besides, the counting value is considered matching the predetermined number if the counting value is smaller than or equal to 0. However, how to determine whether the counting value matches the predetermined number is not limited in the invention.

Particularly, when the counting value matches the predetermined number, it is determined that an unauthorized person is trying to access the second area 640. Conventionally, the memory management circuit 202 locks the second area 640 in order to protect data stored therein. However, once the second area 640 is locked, the corresponding physical blocks cannot be used. In the present exemplary embodiment, when the counting value matches the predetermined number, the memory management circuit 202 re-configures a plurality of logical block addresses to map to the physical blocks 304(0)-304(D) and provides these logical block addresses to the host system 1000, so that the host system 1000 can use the second area 640 as a general storage area.

Figure 7:
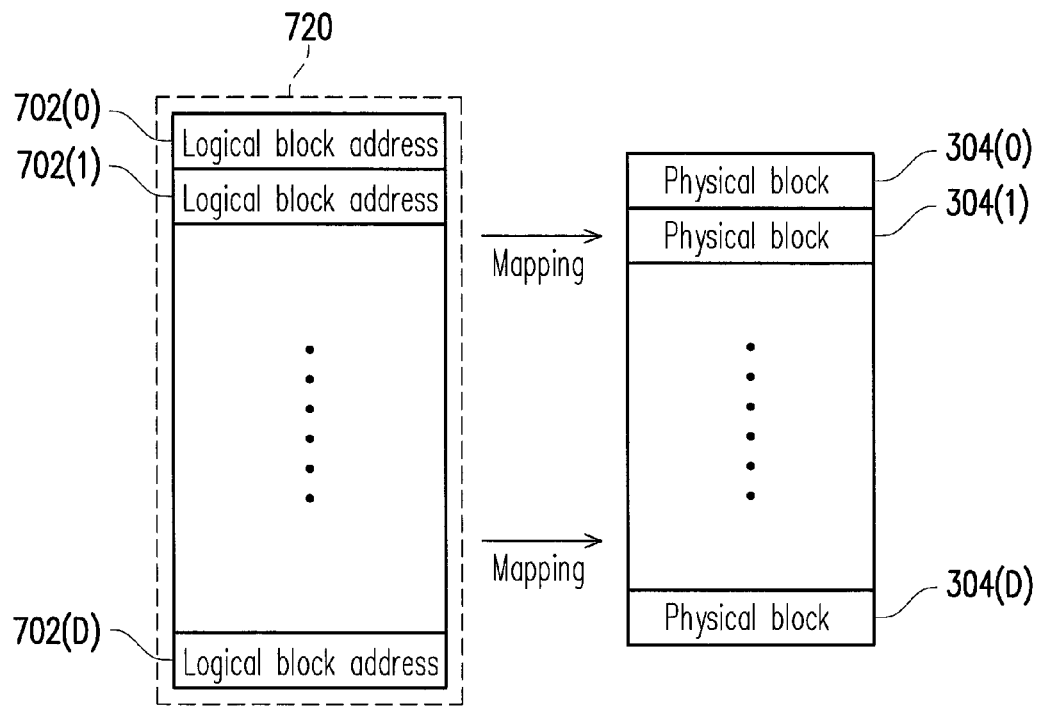
FIG. 7 is a diagram illustrating an example of re-configuring a plurality of logical block addresses according to the first exemplary embodiment.

To be specific, in the present exemplary embodiment, when the counting value matches the predetermined number, the memory management circuit 202 re-establishes the coupling relationship between the memory storage device 100 and the host system 1000 (i.e., re-establishes the coupling relationship between the rewritable non-volatile memory module 106 and the host system 1000) with an uninterruptible power supply. In particular, the uninterruptible power supply refers to that the memory storage device 100 is not actually removed from a slot or connection cable of the host system 1000. Contrarily, the memory storage device 100 remains connected to the slot or connection cable of the host system 1000, and the host system 1000 continues to supply power to the memory storage device 100. Namely, the memory management circuit 202 virtually re-establishes the coupling relationship between the host system 1000 and the memory storage device 100. Next, as shown in FIG. 7, the memory management circuit 202 configures a plurality of logical block addresses 702(0)-702(D) (also referred to as second logical block addresses) to map to the physical blocks 304(0)-304(D). Besides, the memory management circuit 202 groups the logical block addresses 702(0)-702(D) into a third area 720. In particular, the memory management circuit 202 provides the third area 720 to the host system 1000 to be accessed. To be specific, the host system 1000 executes another handshaking procedure with the memory storage device 100 and transmits a handshaking command (referred to as a second command) to the memory management circuit 202. After receiving the second command, the memory management circuit 202 transmits a second message to the host system 1000 to respond to the second command. Herein the second message is used for notifying the host system 1000 that the memory storage device 100 has only the third area 720. Particularly, the logical block addresses 702(0)-702(D) in the third area 720 are mapped to the physical blocks 304(0)-304(D). Namely, the capacity of the third area 720 is a sum of the capacity of the first area 620 and the capacity of the second area 640 (i.e., the capacity of the third area 720 is a sum of the first capacity and the second capacity). Accordingly, after a user inputs incorrect authentication information for over the predetermined number of times, the memory management circuit 202 provides all the physical blocks 304(0)-304(D) to the host system 1000 and the user to be generally accessed, so as to increase the efficiency in using the memory space in the memory storage device 100.

In another exemplary embodiment, the capacity of the third area 720 is a sum of the first capacity and a portion of the second capacity. To be specific, password protected valid data is stored in the second area 640. Herein it is assumed that the valid data is stored in the physical block 304(D). While re-configuring the logical block addresses, the second logical block addresses configured by the memory management circuit 202 are not mapped to the physical block 304(D). Namely, the third area 720 includes the first area 620 and a portion of the second area 640. How much of the second capacity is included in the capacity of the third area 720 is not limited in the invention. In another exemplary embodiment, the capacity of the third area is a sum of the first capacity and the second capacity. While re-configuring the logical block addresses, those second logical block addresses configured to store the password protected valid data are set as damaged.

In another exemplary embodiment, after re-configuring the logical block addresses 702(0)-702(D), the memory management circuit 202 establishes a file system according to the logical block addresses 702(0)-702(D) such that the host system 1000 can access the logical block addresses 702(0)-702(D) according to the file system. The host system 1000 may mount the file system to the file system of the OS 1105 by executing a remounting procedure.

In yet another exemplary embodiment, when the counting value matches the predetermined number, the memory management circuit 202 transmits a message (also referred to as a fourth message) to the application program 1107 to notify the host system 1000 that the logical block addresses LBA(0)-LBA(D) are to be changed. After receiving the fourth message, the application program 1107 notifies the user of the host system 1000 through a user interface to back up data corresponding to the logical block addresses LBA(0)-LBA(A). After the user backs up the data, the application program 1107 issues a reformatting command (also referred to as a second command) to the memory management circuit 202 to reformat the memory storage device 100. The memory management circuit re-configures the logical block addresses 702(0)-702(D) when it is reformatted.

On the other hand, referring to FIG. 6 again, when the authentication information matches the predetermined authentication information, the memory management circuit 202 provides the second area 640 to the host system 1000. To be specific, in an exemplary embodiment, when the authentication information matches the predetermined authentication information, the memory management circuit 202 re-establishes the coupling relationship between the memory storage device 100 and the host system 1000 with an uninterruptible power supply. Next, the host system 1000 executes another handshaking procedure with the memory storage device 100. Herein the host system 1000 transmits a handshaking command (also referred to as a third handshaking command) to the memory management circuit 202 to inquire what areas the memory storage device 100 has. The memory management circuit 202 then transmits a message (also referred to as a third message) to the host system 1000 to respond to the third handshaking command. The third message is used for notifying the host system 1000 that the memory storage device 100 has the first area 620 and the second area 640. Besides, the memory management circuit 202 provides the logical block addresses LBA(0)-LBA(D) to the host system 1000 to be accessed. Thus, once the received authentication information matches the predetermined authentication information, a user of the host system 1000 can access the physical blocks 304(0)-304(D) through the logical block addresses LBA(0)-LBA(D).

In the present exemplary embodiment, the memory storage device 100 is a memory card. However, in other exemplary embodiments, the memory storage device 100 may also be a flash drive. Since a flash drive may have a plurality of partitions, when the counting value matches the predetermined number, the memory management circuit 202 sets the first area 620 as a first partition and sets the second area 640 as a second partition. Besides, the memory management circuit 202 establishes a file system of the first partition and a file system of the second partition. Thereby, the host system 1000 can access the physical blocks 304(0)-304(D) through the first partition and the second partition.

Figure 8:
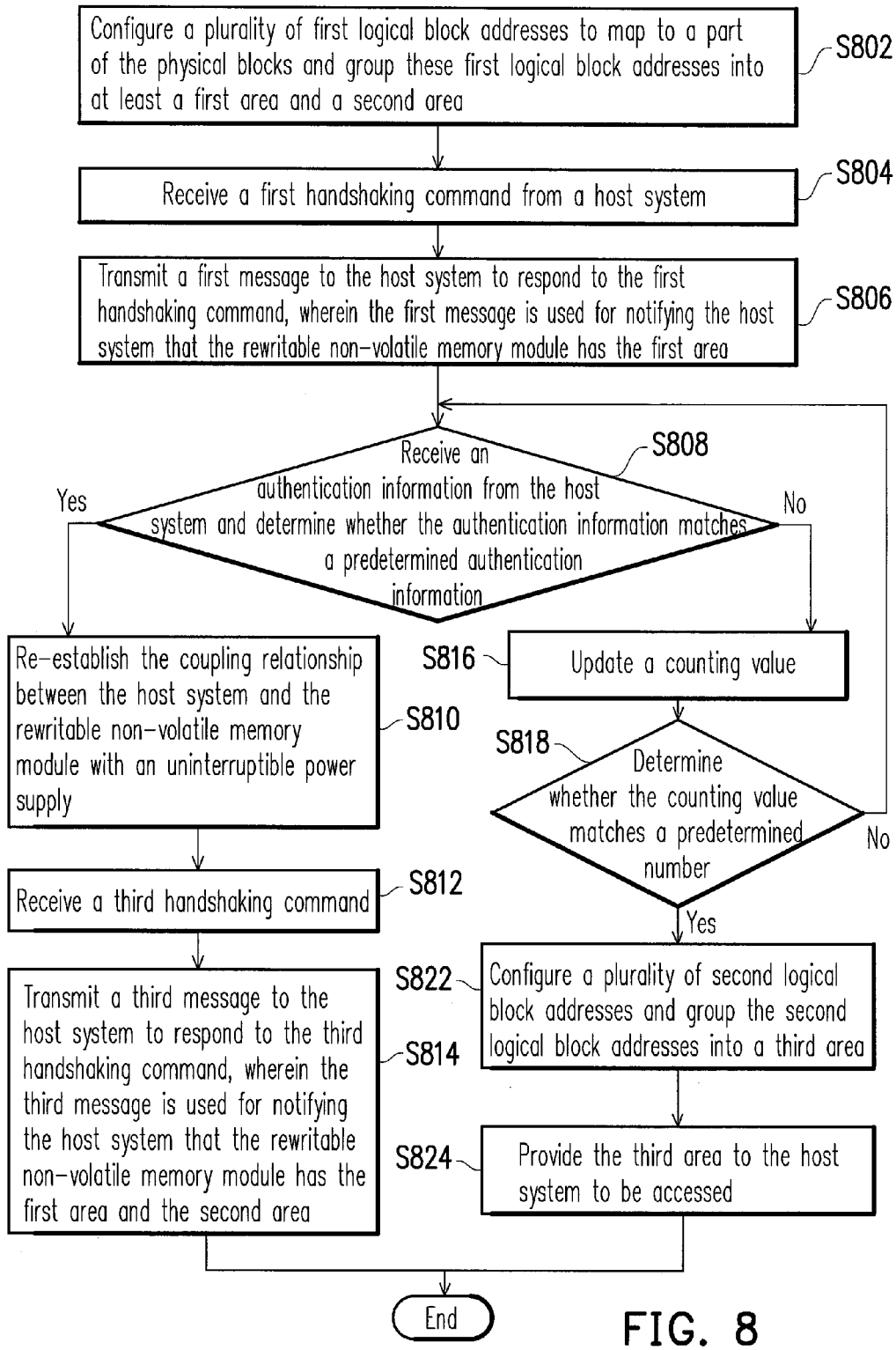
FIG. 8 is a flowchart of a memory space management method according to the first exemplary embodiment.

FIG. 8 is a flowchart of a memory space management method according to the first exemplary embodiment.

Referring to FIG. 8, in step S802, the memory management circuit 202 configures a plurality of first logical block addresses to map to a part of the physical blocks and groups these first logical block addresses into at least a first area and a second area. In step S804, the memory management circuit 202 receives a first handshaking command from a host system. In step S806, the memory management circuit 202 transmits a first message to the host system to respond to the first handshaking command. Herein the first message is used for notifying the host system that the rewritable non-volatile memory module has the first area. In step S808, the memory management circuit 202 receives an authentication information from the host system and determines whether the authentication information matches a predetermined authentication information.

If the authentication information matches the predetermined authentication information, in step S810, the memory management circuit 202 re-establishes the coupling relationship between the host system and the rewritable non-volatile memory module with an uninterruptible power supply. In step S812, the memory management circuit 202 receives a third handshaking command. In step S814, the memory management circuit 202 transmits a third message to the host system to respond to the third handshaking command. Herein the third message is used for notifying the host system that the rewritable non-volatile memory module has the first area and the second area.

If the authentication information does not match the predetermined authentication information, in step S816, the memory management circuit 202 updates a counting value. In step S818, the memory management circuit 202 determines whether the counting value matches a predetermined number.

If the counting value does not match the predetermined number, the memory management circuit 202 returns to step S808. If the counting value matches the predetermined number, in step S822, the memory management circuit 202 configures a plurality of second logical block addresses and groups the second logical block addresses into a third area. In step S824, the memory management circuit 202 provides the third area to the host system to be accessed.

Foregoing steps S822 and S824 are also referred to as a first procedure, and steps S810, S812, and S814 are also referred to as a second procedure. The steps in FIG. 8 have been described above in detail therefore will not be described herein.

Second Exemplary Embodiment

The second exemplary embodiment is similar to the first exemplary embodiment and only the differences between the two will be described herein. In the first exemplary embodiment, the memory management circuit provides the first area to the host system first and only provides the second area to the host system when the host system transmits a correct authentication information. However, in the second exemplary embodiment, the memory management circuit waits for the host system to transmit the authentication information and only provides the first area and the second area to the host system after it confirms the correctness of the authentication information. In another exemplary embodiment, the memory management circuit first notifies the host system that a storage device is coupled thereto. However, system information of the storage device (for example, the capacity of the storage device or the planning of the storage space thereof) can be sent to the host system before or after the authentication information is verified.

Figure 9:
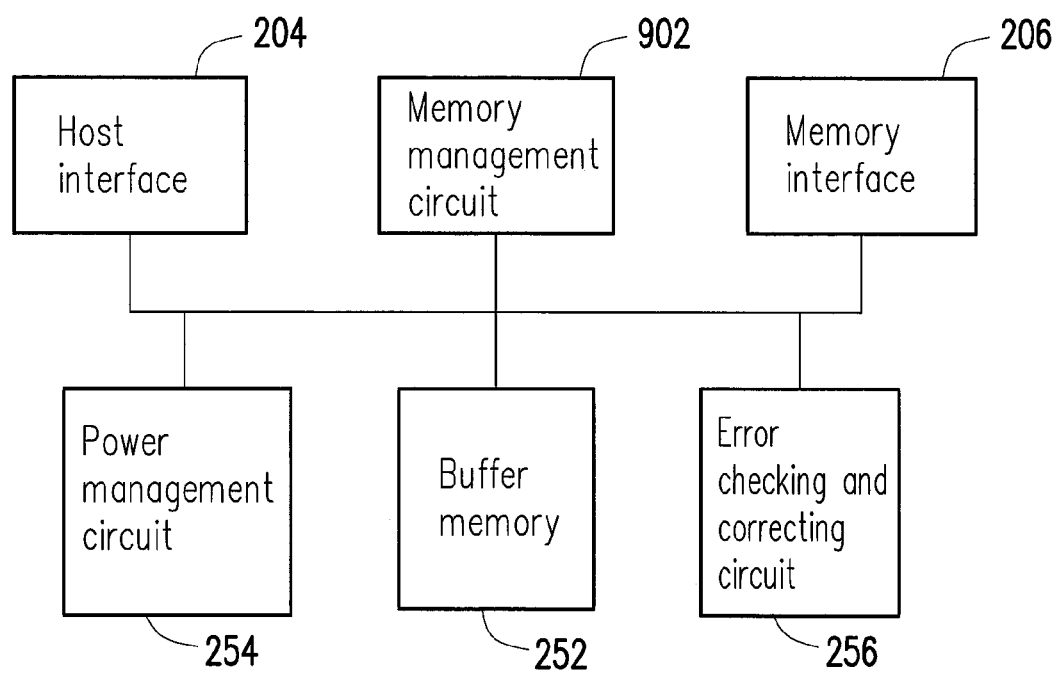
FIG. 9 is a schematic block diagram of a memory controller according to a second exemplary embodiment.

FIG. 9 is a schematic block diagram of a memory controller according to the second exemplary embodiment.

Referring to FIG. 9, in the second embodiment, the memory controller 104 includes a host interface 204, a memory management circuit 902, a memory interface 206, a power management circuit 254, a buffer memory 252, and an ECC circuit 256. The host interface 204, the memory interface 206, the power management circuit 254, the buffer memory 252, and the ECC circuit 256 have been described in detail in the first embodiment therefore will not be described herein.

The memory management circuit 902 controls the operation of the memory controller 104. To be specific, the memory management circuit 902 has a plurality of control instructions, and when the memory storage device 100 is in operation, the control instructions are executed to perform various data operations.

In the present exemplary embodiment, the control instructions of the memory management circuit 902 are implemented in a firmware form. For example, the memory management circuit 902 has a microprocessor unit (not shown) and a ROM (not shown), and the control instructions are burnt into the ROM. When the memory storage device 100 is in operation, the control instructions are executed by the microprocessor unit to carry out various data operations.

In another exemplary embodiment of the invention, the control instructions of the memory management circuit 902 may also be stored in a specific area of the rewritable non-volatile memory module 106 (for example, a system area exclusively used for storing system data in a memory module) as program codes. In addition, the memory management circuit 902 has a microprocessor unit (not shown), a ROM (not shown), and a RAM (not shown). In particular, the ROM has a driving code segment. When the memory controller 104 is enabled, the microprocessor unit first executes the driving code segment to load the control instructions from the rewritable non-volatile memory module 106 into the RAM of the memory management circuit 902. Thereafter, the microprocessor unit runs the control instructions to perform various data operations.

Moreover, in yet another exemplary embodiment of the invention, the control instructions of the memory management circuit 902 may also be implemented in a hardware form. For example, the memory management circuit 902 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage the physical blocks of the rewritable non-volatile memory module 106. The memory writing unit is configured to issue a write command to the rewritable non-volatile memory module 106 to write data into the rewritable non-volatile memory module 106. The memory reading unit is configured to issue a read command to the rewritable non-volatile memory module 106 to read data from the rewritable non-volatile memory module 106. The memory erasing unit is configured to issue an erase command to the rewritable non-volatile memory module 106 to erase data from the rewritable non-volatile memory module 106. The data processing unit is configured to process data to be written into or read from the rewritable non-volatile memory module 106.

Figure 10:
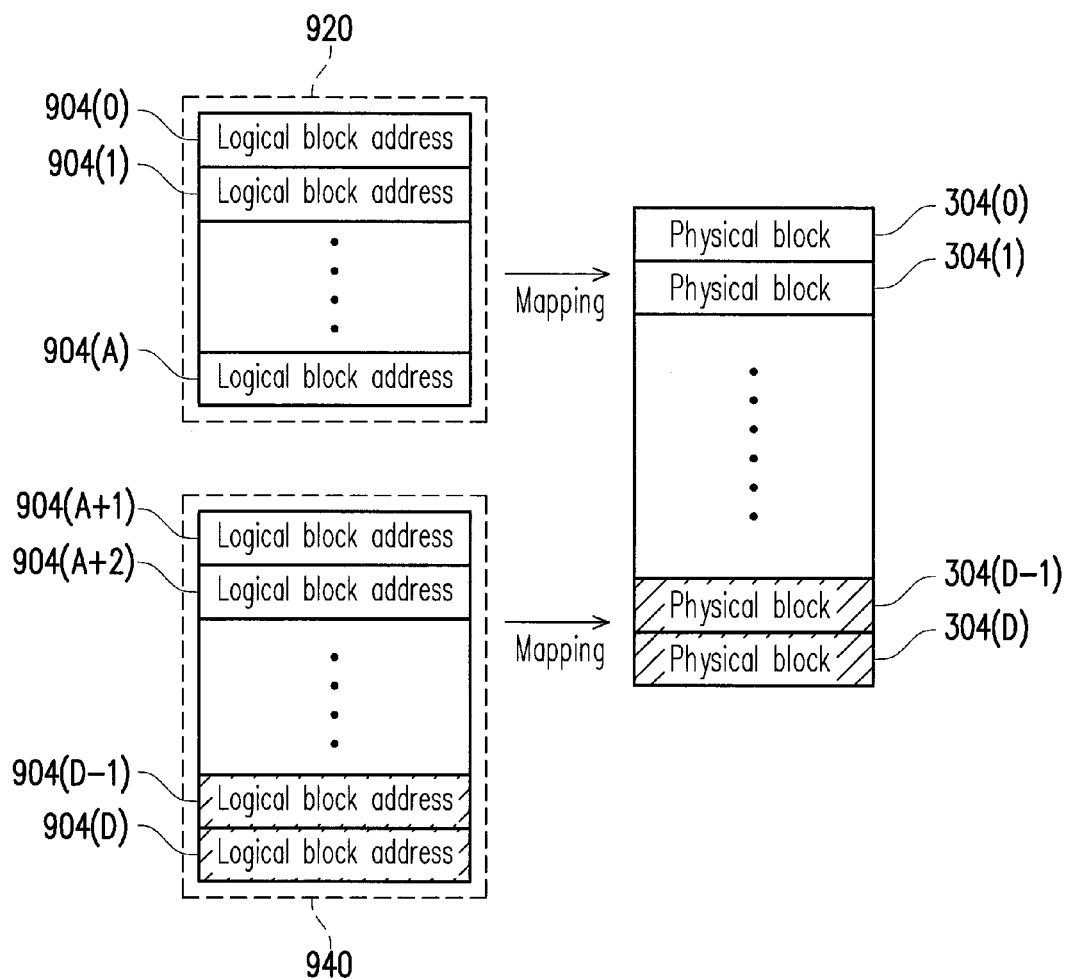
FIG. 10 is a diagram illustrating an example of defining a first area and a second area according to the second exemplary embodiment.

FIG. 10 is a diagram illustrating an example of defining a first area and a second area according to the second exemplary embodiment.

Referring to FIG. 10, the memory management circuit 902 configures logical block addresses 904(0)-904(D) (also referred to as first logical block addresses) to map to the physical blocks 304(0)-304(D) in the data area 402. Besides, the memory management circuit 902 groups the logical block addresses 904(0)-904(D) into a first area 920 and a second area 940. The first area 920 includes the logical block addresses 904(0)-904(A), and the second area 940 includes the logical block addresses 904(A+1)-904(D). Besides, the second area 940 is protected by a password, and the host system 1000 can pass identify verification to access the second area 940. However, in the second exemplary embodiment, when the memory storage device 100 is coupled to the host system 1000, the memory management circuit 902 does not provide the first area 920 to the host system 1000 first. The memory management circuit 902 first receives an authentication information from the host system 1000 and determines whether the authentication information matches a predetermined authentication information. The memory management circuit 902 determines whether to provide the first area 920 and the second area 940 to the host system 1000 only after it determines whether the authentication information matches the predetermined authentication information. To be specific, if the authentication information received from the host system 1000 matches the predetermined authentication information, the memory management circuit 902 transmits a message to the host system 1000 to notify the host system 1000 that the rewritable non-volatile memory module 106 has the first area 920 and the second area 940 and the second area 940 is accessible. Then the memory management circuit 902 sets the first area 920 and the second area 940 to be accessible. Accordingly, when the authentication information input to the host system 1000 by a user matches the predetermined authentication information, the user can access the first area 920 and the second area 940 through the host system 1000.

On the other hand, if the authentication information does not match the predetermined authentication information, the memory management circuit 902 updates a counting value and determines whether the counting value matches a predetermined number. However, the memory management circuit 902 determines whether the counting value matches the predetermined number in the same way as the memory management circuit 202 in the first exemplary embodiment determines whether the counting value matches the predetermined number. Thus, how the memory management circuit 902 determines whether the counting value matches the predetermined number will not be described herein. When the counting value does not match the predetermined number, the memory management circuit 902 transmits a message to the host system 1000 to notify the host system 1000 that the rewritable non-volatile memory module 106 has the first area 920 and the second area 940. Herein the memory management circuit 902 sets the first area 920 to be accessible and the second area 940 to be inaccessible. Accordingly, even though the host system 1000 can get to know that the rewritable non-volatile memory module 106 has the first area 920 and the second area 940, it cannot access the password protected second area 940 since it does not transmit a correct authentication information to the memory management circuit 902.

Additionally, when the counting value matches the predetermined number, the memory management circuit 902 re-configures a plurality of logical block addresses and groups the logical block addresses into a third area. The third area includes the first area 920 and at least a portion of the second area 940. Besides, the memory management circuit 902 provides the third area to the host system 1000. In particular, because password protected valid data is stored in the physical blocks originally mapped to the second area 940, while defining the third area, the memory management circuit 902 sets the valid data originally in the second area 940 as inaccessible. For example, the logical block addresses 904(D-1) and 904(D) are mapped to the physical blocks 304(D-1) and 304(D), and valid data belonging to the second area 940 is stored in the physical blocks 304(D-1) and 304(D). In other words, the memory management circuit 902 sets data stored in the physical blocks 304(D-1) and 304(D) as inaccessible.

Figure 11:
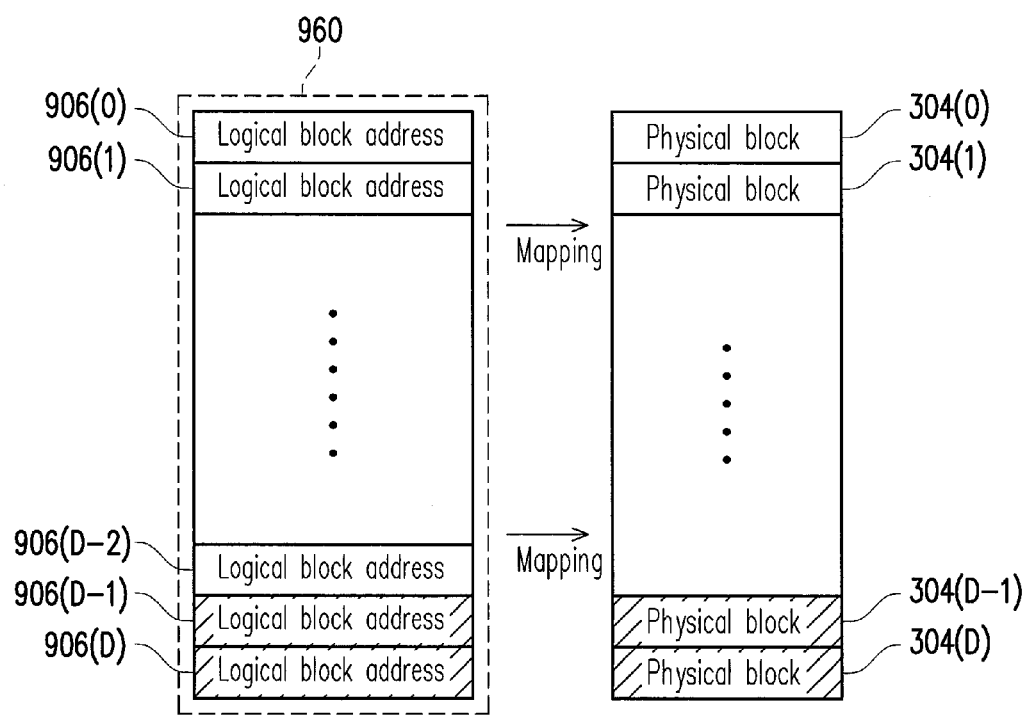
FIG. 11 is a diagram illustrating an example of re-configuring a plurality of logical block addresses according to the second exemplary embodiment.

FIG. 11 is a diagram illustrating an example of re-configuring a plurality of logical block addresses according to the second exemplary embodiment.

Referring to FIG. 11, when the counting value matches the predetermined number, the memory management circuit 902 configures the logical block addresses 906(0)-906(D) to map to the physical blocks 304(0)-304(D). Besides, the memory management circuit 902 groups the logical block addresses 906(0)-906(D) into a third area 960 and provides the third area 960 to the host system 1000 to be accessed. Particularly, because the physical blocks 304(D-1) and 304(D) store valid data originally in the second area 940, in an exemplary embodiment, the memory management circuit 902 sets the logical block addresses 906(D-1) and 906(D) mapped to the physical blocks 304(D-1) and 304(D) as inaccessible. Accordingly, the host system 1000 cannot access data in the physical blocks 304(D-1) and 304(D). However, in another exemplary embodiment, the memory management circuit 902 may also delete the data stored in the physical blocks 304(D-1) and 304(D) and then set the logical block addresses 906(D-1) and 906(D) as accessible. In yet another exemplary embodiment, the memory management circuit 902 may also set the physical blocks 304(D-1) and 304(D) as damaged physical blocks, so that the host system 1000 cannot access the physical blocks 304(D-1) and 304(D). In still another exemplary embodiment, the memory management circuit 902 may also group the logical block addresses 906(0)-906(D-2) into a third area and provides the third area to the host system 1000. In other words, in an exemplary embodiment, the logical block addresses in the third area 960 are not mapped to the physical blocks 304(D-1) and 304(D). However, how the valid data in the physical blocks 304(D-1) and 304(D) is set to be inaccessible is not limited in the invention.

After the memory management circuit 902 provides the third area 960 to the host system 1000, the host system 1000 needs not to pass the identify verification to access the physical blocks originally mapped to the second area 940. Herein if the host system 1000 transmits another authentication information to the memory management circuit 902, the memory management circuit 902 also provides the third area 960 to the host system 1000 without determining whether the authentication information matches the predetermined authentication information.

It should be noted that foregoing steps of re-configuring the second logical block addresses, defining the third area 960, and providing the third area 960 to the host system 1000 are a non-reversible procedure. Namely, the rewritable non-volatile memory module 106 can be accessed without any identify verification, and the third area 960 cannot be redefined into the first area 920 and the second area 940.

Figure 12:
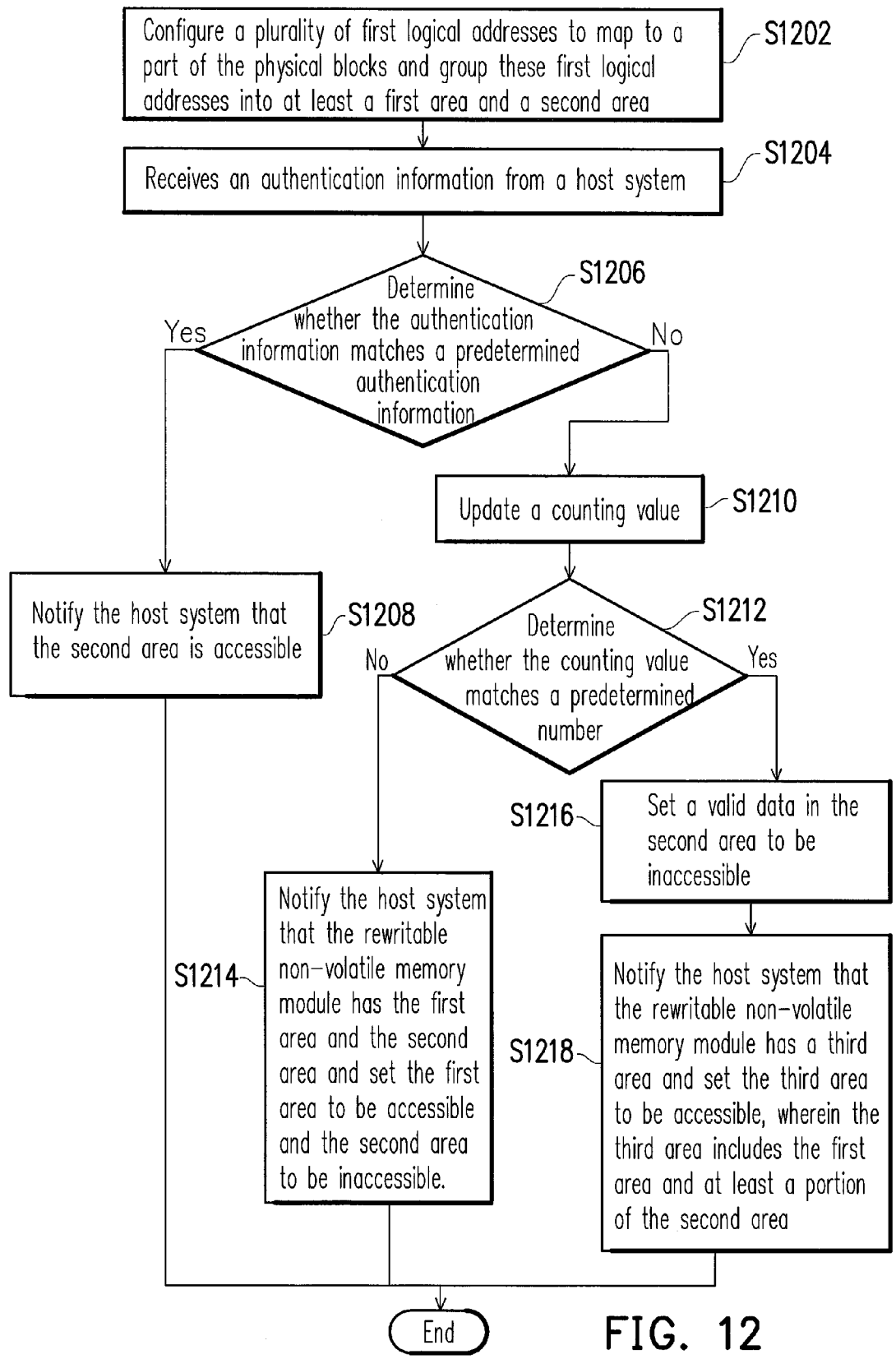
FIG. 12 is a flowchart of a memory space management method according to the second exemplary embodiment.

FIG. 12 is a flowchart of a memory space management method according to the second exemplary embodiment.

Referring to FIG. 12, in step S1202, the memory management circuit 902 configures a plurality of first logical addresses to map to a part of the physical blocks and groups these first logical addresses into at least a first area and a second area. In step S1204, the memory management circuit 902 receives an authentication information from a host system. In step S1206, the memory management circuit 902 determines whether the authentication information matches a predetermined authentication information.

If the authentication information matches the predetermined authentication information, in step S1208, the memory management circuit 902 notifies the host system that the second area is accessible.

If the authentication information does not match the predetermined authentication information, in step S1210, the memory management circuit 902 updates a counting value. In step S1212, the memory management circuit 902 determines whether the counting value matches a predetermined number.

If the counting value does not match the predetermined number, in step S1214, the memory management circuit 902 notifies the host system that the rewritable non-volatile memory module has the first area and the second area and sets the first area to be accessible and the second area to be inaccessible.

If the counting value matches the predetermined number, in step S1216, the memory management circuit 902 sets a valid data in the second area to be inaccessible. In step S1218, the memory management circuit 902 notifies the host system that the rewritable non-volatile memory module has a third area and sets the third area to be accessible, wherein the third area includes the first area and at least a portion of the second area.

Foregoing step S1208 is referred to as a second procedure, foregoing step S1214 is referred to as a third procedure, and foregoing steps S1216 and S1218 are referred to as a first procedure. In the present exemplary embodiment, the first procedure is a non-reversible procedure. However, the invention is not limited thereto. To be specific, after the memory management circuit 902 notifies the host system that the rewritable non-volatile memory module has the third area, the memory management circuit 902 finalizes the planning of the storage space of the system. Namely, in normal operation states, the memory management circuit does not provide the password protected second area to the host system even if a correct authentication information is received. The steps in FIG. 12 have been described above in detail therefore will not be described herein.

As described above, exemplary embodiments of the invention provide a memory space management method, a memory controller and a memory storage device, in which after a user inputs incorrect authentication information for over a predetermined number of times, an originally locked area is provided to the user to be accessed, so that the memory space in the memory storage device can be effectively used.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory space management method, adapted to a rewritable non-volatile memory module, wherein the rewritable non-volatile memory module comprises a plurality of physical blocks, the memory space management method comprising:
    configuring a plurality of first logical block addresses to map to a part of the physical blocks, and grouping the first logical block addresses into at least a first area and a second area, wherein a capacity of the first area is a first capacity, and a capacity of the second area is a second capacity;
    receiving a first handshaking command from a host system;
    transmitting a first message to the host system to respond to the first handshaking command, wherein the first message is used for notifying the host system that the rewritable non-volatile memory module has the first area;
    receiving an authentication information from the host system, and determining whether the authentication information matches a predetermined authentication information;
    when the authentication information does not match the predetermined authentication information, updating a counting value; and
    when the counting value matches a predetermined number, executing a first procedure, wherein the first procedure comprises:
        configuring a plurality of second logical block addresses, and grouping the second logical block addresses into a third area, wherein a capacity of the third area is a sum of the first capacity and at least a portion of the second capacity; and
        providing the third area to the host system to be accessed.

2. The memory space management method according to claim 1 further comprising:
    when the authentication information matches the predetermined authentication information, executing a second procedure, wherein the second procedure comprises:
    re-establishing a coupling relationship between the host system and the rewritable non-volatile memory module with an uninterruptible power supply;
    receiving a third handshaking command; and
    transmitting a third message to the host system to respond to the third handshaking command, wherein the third message is used for notifying the host system that the rewritable non-volatile memory module has the first area and the second area.

3. The memory space management method according to claim 1, wherein the first procedure further comprises:
    re-establishing a coupling relationship between the host system and the rewritable non-volatile memory module with an uninterruptible power supply.

4. The memory space management method according to claim 1, wherein the first procedure further comprises:
    transmitting a fourth message to the host system, wherein the fourth message is used for notifying the host system that the first logical block addresses are to be changed.

5. The memory space management method according to claim 1 further comprising:
    when the counting value matches the predetermined number, setting the first area as a first partition, setting the second area as a second partition, and establishing a file system of the first partition and a file system of the second partition.

6. A memory storage device, comprising:
a connector, configured for coupling a host system;
a rewritable non-volatile memory module, comprising a plurality of physical blocks; and
a memory controller, coupled to the connector and the rewritable non-volatile memory module,
wherein the memory controller is adapted to configure a plurality of first logical block addresses to map to a part of the physical blocks and groups the first logical block addresses into at least a first area and a second area, wherein a capacity of the first area is a first capacity, and a capacity of the second area is a second capacity,
wherein the memory controller is configured to receive a first handshaking command from a host system,
wherein the memory, controller is configured to transmit a first message to the host system to respond to the first handshaking command, and the first message is used for notifying the host system that the memory storage device has the first area, wherein the memory controller is configured to receive an authentication information from the host system and determines whether the authentication information matches a predetermined authentication information, wherein when the authentication information does not match the predetermined authentication information, the memory controller is configured to update a counting value, wherein when the counting value matches a predetermined number, the memory controller is adapted to configure a plurality of second logical block addresses and group the second logical block addresses into a third area, wherein a capacity of the third area is a sum of the first capacity and at least a portion of the second capacity, and the memory controller is further configured to provide the third area to the host system to be accessed.

7. The memory storage device according to claim 6, wherein when the authentication information matches the predetermined authentication information, the memory controller is configured to re-establish a coupling relationship between the host system and the memory storage device with an uninterruptible power supply, the memory controller is further configured to receive a third handshaking command and transmit a third message to the host system to respond to the third handshaking command, wherein the third message is used for notifying the host system that the memory storage device has the first area and the second area.

8. The memory storage device according to claim 6, wherein the memory controller is further configured to re-establish a coupling relationship between the host system and the memory storage device with an uninterruptible power supply.

9. The memory storage device according to claim 6, wherein the memory controller is further configured to transmit a fourth message to the host system, and the fourth message is used for notifying the host system that the first logical block addresses are to be changed.

10. The memory storage device according to claim 6, wherein when the counting value matches the predetermined number, the memory controller is configured to set the first area as a first partition, set the second area as a second partition, and establish a file system of the first partition and a file system of the second partition.

11. A memory controller, comprising:
a host interface, configured for coupling a host system;
a memory interface, configured for coupling a rewritable non-volatile memory module, wherein the rewritable non-volatile memory module comprises a plurality of physical blocks; and
a memory management circuit, coupled to the connector and the rewritable non-volatile memory module,
wherein the memory management circuit is adapted to configure a plurality of first logical block addresses to map to a part of the physical blocks and group the first logical block addresses into at least a first area and a second area, wherein a capacity of the first area is a first capacity, and a capacity of the second area is a second capacity,
wherein the memory management circuit is configured to receive a first handshaking command from a host system,
wherein the memory management circuit is configured to transmit a first message to the host system to respond to the first handshaking command, and the first message is used for notifying the host system that the rewritable non-volatile memory module has the first area, wherein the memory management circuit is configured to receive an authentication information from the host system and determine whether the authentication information matches a predetermined authentication information, wherein when the authentication information does not match the predetermined authentication information, the memory management circuit is configured to update a counting value, wherein when the counting value matches a predetermined number, the memory management circuit is adapted to configure a plurality of second logical block addresses and group the second logical block addresses into a third area, wherein a capacity of the third area is a sum of the first capacity and at least a portion of the second capacity, and the memory management circuit is further configured to provide the third area to the host system to be accessed.

12. The memory controller according to claim 11, wherein when the authentication information matches the predetermined authentication information, the memory management circuit is configured to re-establish a coupling relationship between the host system and the rewritable non-volatile memory module with an uninterruptible power supply, the memory management circuit is further configured to receive a third handshaking command and transmit a third message to the host system to respond to the third handshaking command, wherein the third message is used for notifying the host system that the rewritable non-volatile memory module has the first area and the second area.

13. The memory controller according to claim 11, wherein the memory management circuit is further configured to re-establish a coupling relationship between the host system and the rewritable non-volatile memory module with an uninterruptible power supply.

14. The memory controller according to claim 11, wherein the memory management circuit is configured to transmit a fourth message to the host system, and the fourth message is used for notifying the host system that the first logical block addresses are to be changed.

15. The memory controller according to claim 11, wherein when the counting value matches the predetermined number, the memory management circuit is configured to set the first area as a first partition, set the second area as a second partition, and establish a file system of the first partition and a file system of the second partition.

16. A memory space management method, adapted to a rewritable non-volatile memory module, wherein the rewritable non-volatile memory module comprises a plurality of physical blocks, the memory space management method comprising:
configuring a plurality of first logical block addresses to map to at least a part of the physical blocks, and grouping the first logical block addresses into at least a first area and a second area;
receiving an authentication information from the host system, and determining whether the authentication information matches a predetermined authentication information;
when the authentication information matches the predetermined authentication information, executing a second procedure, wherein the second procedure comprises:

notifying the host system that the second area is accessible;

when the authentication information does not match the predetermined authentication information, updating a counting value and determining whether the counting value matches a predetermined number;

when the counting value does not match the predetermined number, executing a third procedure, wherein the third procedure comprises:

notifying the host system that the first area of the rewritable non-volatile memory module is accessible and the second area of the rewritable non-volatile memory module is inaccessible;

when the counting value matches the predetermined number, executing a first procedure, wherein the first procedure comprises:

setting a valid data in the second area as inaccessible;

notifying the host system that a third area of the rewritable non-volatile memory module is accessible, wherein the third area comprises the first area and at least a portion of the second area.

17. The memory space management method according to claim 16, wherein after executing the first procedure, the memory space management method further comprises:

after receiving the authentication information from the host system, providing the third area to the host system to be accessed.

18. The memory space management method according to claim 16, wherein the first procedure is a non-reversible procedure.

* * * * *